United States Patent
Carson, Jr. et al.

(10) Patent No.: US 10,639,863 B2
(45) Date of Patent: May 5, 2020

(54) INJECTION MOLDED COMPOSITE BLANK AND GUIDE

(71) Applicant: Cutting Dynamics, Inc., Avon, OH (US)

(72) Inventors: William V. Carson, Jr., Bay Village, OH (US); George Bielert, San Jose, CA (US); Rocco DeAngelis, Lorain, OH (US)

(73) Assignee: Cutting Dynamics, Inc., Avon, OH (US)

( * ) Notice: Subject to any disclaimer, the term of this patent is extended or adjusted under 35 U.S.C. 154(b) by 0 days.

(21) Appl. No.: 16/048,297

(22) Filed: Jul. 29, 2018

(65) Prior Publication Data

US 2019/0022970 A1    Jan. 24, 2019

Related U.S. Application Data

(63) Continuation of application No. 14/386,382, filed as application No. PCT/US2013/033465 on Mar. 22, 2013, now Pat. No. 10,059,078.

(Continued)

(51) Int. Cl.
  *B32B 3/24* (2006.01)
  *B32B 5/02* (2006.01)
  (Continued)

(52) U.S. Cl.
  CPC ............ *B32B 3/266* (2013.01); *A47C 7/40* (2013.01); *B29C 45/14* (2013.01);
  (Continued)

(58) Field of Classification Search
  None
  See application file for complete search history.

(56) References Cited

U.S. PATENT DOCUMENTS 5,799,548 A * 9/1998 Brooks ................. F16H 57/032
  74/606 R
6,783,486 B1 * 8/2004 Murakami ........ B29C 45/14344
  225/96

(Continued)

FOREIGN PATENT DOCUMENTS

DE       4120133 A1 * 12/1992 ....... B29C 45/14336
DE  102008033621 A1 *  1/2010 ....... B29C 45/14631

(Continued)

OTHER PUBLICATIONS

Machine Translation of DE 4120133 A1, Dec. 1992 (Year: 1992).*

(Continued)

*Primary Examiner* — Jeffrey A Vonch
(74) *Attorney, Agent, or Firm* — Edwin A. Sisson, Attorney at Law, LLC; Edwin A. Sisson; Jeffrey J. Banyas

(57) ABSTRACT

This specification discloses an article of manufacture. The article of manufacture has at least one structural blank and at least one guide. The structural blank has a plurality of oriented fiber plies in a thermoplastic matrix. The guide has a plurality of random dispersed fibers in a thermoplastic matrix. The guide is affixed to the structural blank by injection molding and over molding the guide onto the structural blank. The article of manufacture can take a number of forms for use in industries such as aircraft, automobiles, motorcycles, bicycles, trains or watercraft.

14 Claims, 11 Drawing Sheets

Related U.S. Application Data

(60) Provisional application No. 61/615,040, filed on Mar. 23, 2012, provisional application No. 61/615,000, filed on Mar. 23, 2012.

(51) Int. Cl.

| | | |
|---|---|---|
| *B29C 70/06* | (2006.01) | |
| *B29C 70/12* | (2006.01) | |
| *B29C 70/16* | (2006.01) | |
| *B29C 70/20* | (2006.01) | |
| *B29C 70/22* | (2006.01) | |
| *B29C 45/14* | (2006.01) | |
| *B32B 3/26* | (2006.01) | |
| *B29C 70/74* | (2006.01) | |
| *B29C 70/76* | (2006.01) | |
| *B29C 65/00* | (2006.01) | |
| *A47C 7/40* | (2006.01) | |
| *B29C 65/48* | (2006.01) | |
| *B29C 65/56* | (2006.01) | |
| *B29C 65/58* | (2006.01) | |
| *B60N 2/68* | (2006.01) | |
| *B32B 5/26* | (2006.01) | |
| *B32B 5/28* | (2006.01) | |
| *B32B 27/28* | (2006.01) | |
| *B29L 31/30* | (2006.01) | |
| *B32B 27/36* | (2006.01) | |
| *B29K 309/08* | (2006.01) | |
| *B29K 105/08* | (2006.01) | |
| *B29K 71/00* | (2006.01) | |
| *B29K 67/00* | (2006.01) | |
| *B29K 79/00* | (2006.01) | |
| *B29K 81/00* | (2006.01) | |
| *B29C 65/08* | (2006.01) | |
| *B29C 65/34* | (2006.01) | |
| *B29C 65/50* | (2006.01) | |
| *B29C 65/72* | (2006.01) | |
| *B29C 45/00* | (2006.01) | |
| *B29L 31/00* | (2006.01) | |
| *B29K 101/12* | (2006.01) | |
| *B29K 277/00* | (2006.01) | |
| *B29K 307/04* | (2006.01) | |
| *B29K 23/00* | (2006.01) | |
| *B29K 55/02* | (2006.01) | |
| *B29K 59/00* | (2006.01) | |
| *B29K 69/00* | (2006.01) | |
| *B29K 75/00* | (2006.01) | |
| *B29K 77/00* | (2006.01) | |
| *B29K 305/00* | (2006.01) | |

(52) U.S. Cl.
CPC ........ *B29C 45/14311* (2013.01); *B29C 65/48* (2013.01); *B29C 65/565* (2013.01); *B29C 65/58* (2013.01); *B29C 66/12443* (2013.01); *B29C 66/12449* (2013.01); *B29C 66/12461* (2013.01); *B29C 66/12463* (2013.01); *B29C 66/12469* (2013.01); *B29C 66/301* (2013.01); *B29C 66/536* (2013.01); *B29C 66/72143* (2013.01); *B29C 66/7392* (2013.01); *B29C 66/73921* (2013.01); *B29C 70/06* (2013.01); *B29C 70/12* (2013.01); *B29C 70/74* (2013.01); *B29C 70/76* (2013.01); *B32B 5/26* (2013.01); *B60N 2/68* (2013.01); *B29C 45/14786* (2013.01); *B29C 65/08* (2013.01); *B29C 65/34* (2013.01); *B29C 65/50* (2013.01); *B29C 65/5057* (2013.01); *B29C 65/72* (2013.01); *B29C 66/028* (2013.01); *B29C 66/126* (2013.01); *B29C 66/5414* (2013.01); *B29C 66/71* (2013.01); *B29C 66/7212* (2013.01); *B29C 66/72141* (2013.01); *B29C 70/16* (2013.01); *B29C 70/20* (2013.01); *B29C 70/202* (2013.01); *B29C 70/22* (2013.01); *B29C 2045/0008* (2013.01); *B29C 2045/14319* (2013.01); *B29C 2045/14327* (2013.01); *B29C 2045/14868* (2013.01); *B29C 2045/14877* (2013.01); *B29K 2023/12* (2013.01); *B29K 2055/02* (2013.01); *B29K 2059/00* (2013.01); *B29K 2067/00* (2013.01); *B29K 2067/003* (2013.01); *B29K 2067/006* (2013.01); *B29K 2069/00* (2013.01); *B29K 2071/00* (2013.01); *B29K 2075/00* (2013.01); *B29K 2075/02* (2013.01); *B29K 2077/00* (2013.01); *B29K 2079/00* (2013.01); *B29K 2079/08* (2013.01); *B29K 2079/085* (2013.01); *B29K 2081/04* (2013.01); *B29K 2081/06* (2013.01); *B29K 2101/12* (2013.01); *B29K 2105/089* (2013.01); *B29K 2105/0845* (2013.01); *B29K 2105/0881* (2013.01); *B29K 2277/00* (2013.01); *B29K 2277/10* (2013.01); *B29K 2305/00* (2013.01); *B29K 2307/04* (2013.01); *B29K 2309/08* (2013.01); *B29L 2031/003* (2013.01); *B29L 2031/008* (2013.01); *B29L 2031/3055* (2013.01); *B29L 2031/3076* (2013.01); *B29L 2031/771* (2013.01); *B32B 5/022* (2013.01); *B32B 5/024* (2013.01); *B32B 5/28* (2013.01); *B32B 27/281* (2013.01); *B32B 27/285* (2013.01); *B32B 27/286* (2013.01); *B32B 27/288* (2013.01); *B32B 27/36* (2013.01); *B32B 2250/20* (2013.01); *B32B 2250/24* (2013.01); *B32B 2305/076* (2013.01); *B32B 2305/08* (2013.01); *B32B 2305/10* (2013.01); *B32B 2305/18* (2013.01); *B32B 2305/188* (2013.01); *B32B 2305/20* (2013.01); *B32B 2305/22* (2013.01); *B32B 2310/14* (2013.01); *B32B 2367/00* (2013.01); *B32B 2371/00* (2013.01); *B32B 2379/00* (2013.01); *B32B 2398/20* (2013.01); *B32B 2605/00* (2013.01); *B32B 2605/003* (2013.01); *B32B 2605/18* (2013.01); *Y10T 428/24182* (2015.01); *Y10T 428/24322* (2015.01); *Y10T 428/24612* (2015.01); *Y10T 428/24785* (2015.01); *Y10T 428/24994* (2015.04); *Y10T 428/24995* (2015.04); *Y10T 428/249942* (2015.04); *Y10T 442/20* (2015.04)

(56) References Cited

U.S. PATENT DOCUMENTS

2003/0205844 A1* 11/2003 Delusky ................ B29C 31/044
264/259
2007/0292669 A1* 12/2007 Yamasaki ............. B29C 70/086
428/213

FOREIGN PATENT DOCUMENTS

| EP | 0146358 A1 | * | 6/1985 | ............ B60G 11/12 |
|---|---|---|---|---|
| EP | 0821186 B1 | * | 3/2003 | ........... F16H 57/032 |
| EP | 1331150 B1 | * | 3/2006 | ......... B29C 37/0082 |
| GB | 2008022 A | * | 5/1979 | ................ H05K 7/12 |
| JP | 60219035 A | * | 11/1985 | ........... B29D 99/001 |
| JP | 06023856 A | * | 2/1994 | |
| JP | 07000562 A | * | 1/1995 | ....... B29C 45/14778 |
| JP | 11298158 A | * | 10/1999 | ....... B29C 45/14778 |
| JP | 2005271583 A | * | 10/2005 | ....... B29C 45/14336 |

(56) References Cited

FOREIGN PATENT DOCUMENTS

| | | | | |
|---|---|---|---|---|
| JP | 2008114525 | A | * | 5/2008 |
| JP | 2009267313 | A | * | 11/2009 |
| JP | 2010131804 | A | * | 6/2010 |
| JP | 2010253697 | A | * | 11/2010 |

OTHER PUBLICATIONS

Machine Translation of JP 06-023856 A, Feb. 1994 (Year: 1994).*
Machine Translation of JP 07-000562 A, Jan. 1995 (Year: 1995).*
Machine Translation of JP 11-298158 A, Oct. 1999 (Year: 1999).*
Machine Translation of JP 2005271583 A, Oct. 2005 (Year: 2005).*
Machine Translation of DE 102008033621 A1, Jan. 2010 (Year: 2010).*
Materials.co.uk, Polymers and Composites, Nov. 2010, <https://www.materials.co.uk/polymers.htm> (Year: 2010).*
Machine Translation of EP-0821186-B1, Mar. 2003 (Year: 2003).*
Machine Translation of EP-1331150-B1, Mar. 2006 (Year: 2006).*

* cited by examiner

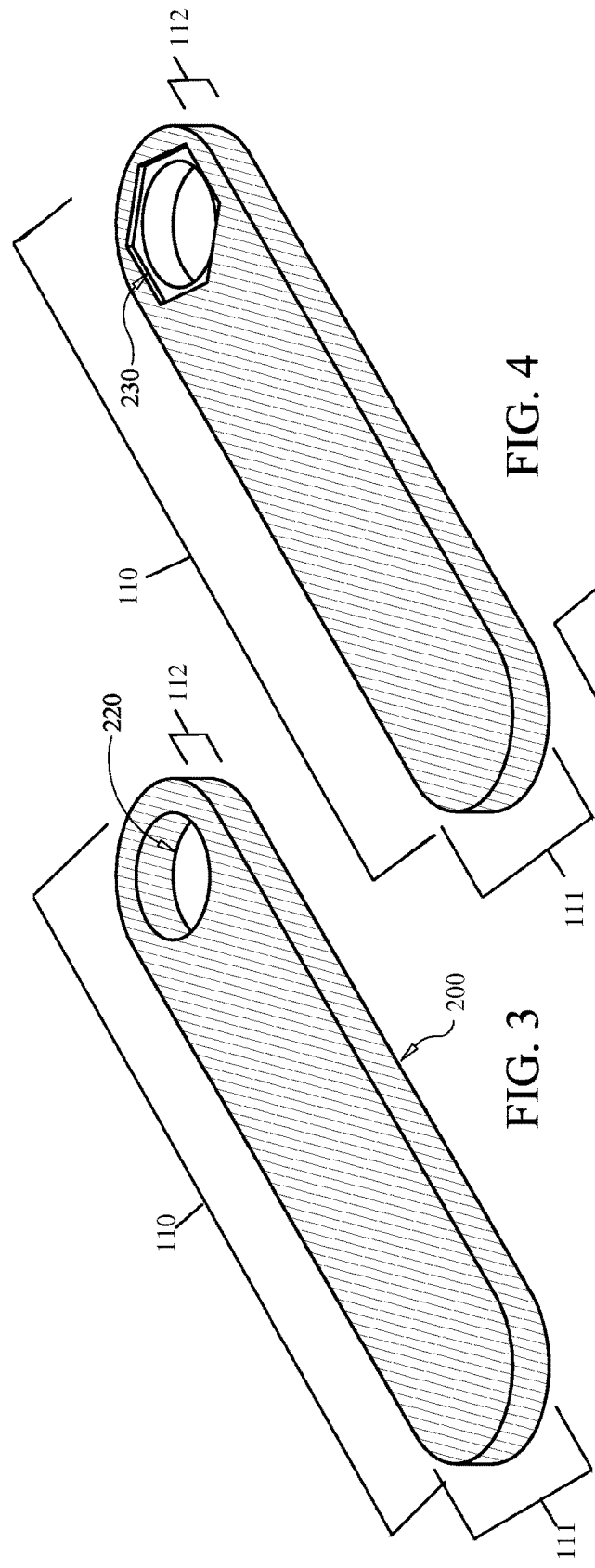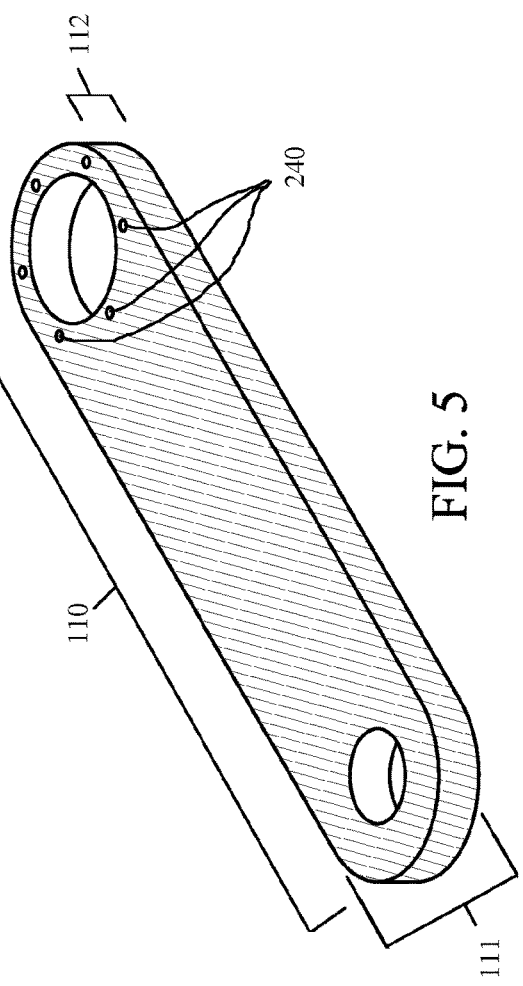
FIG. 3
FIG. 4
FIG. 5

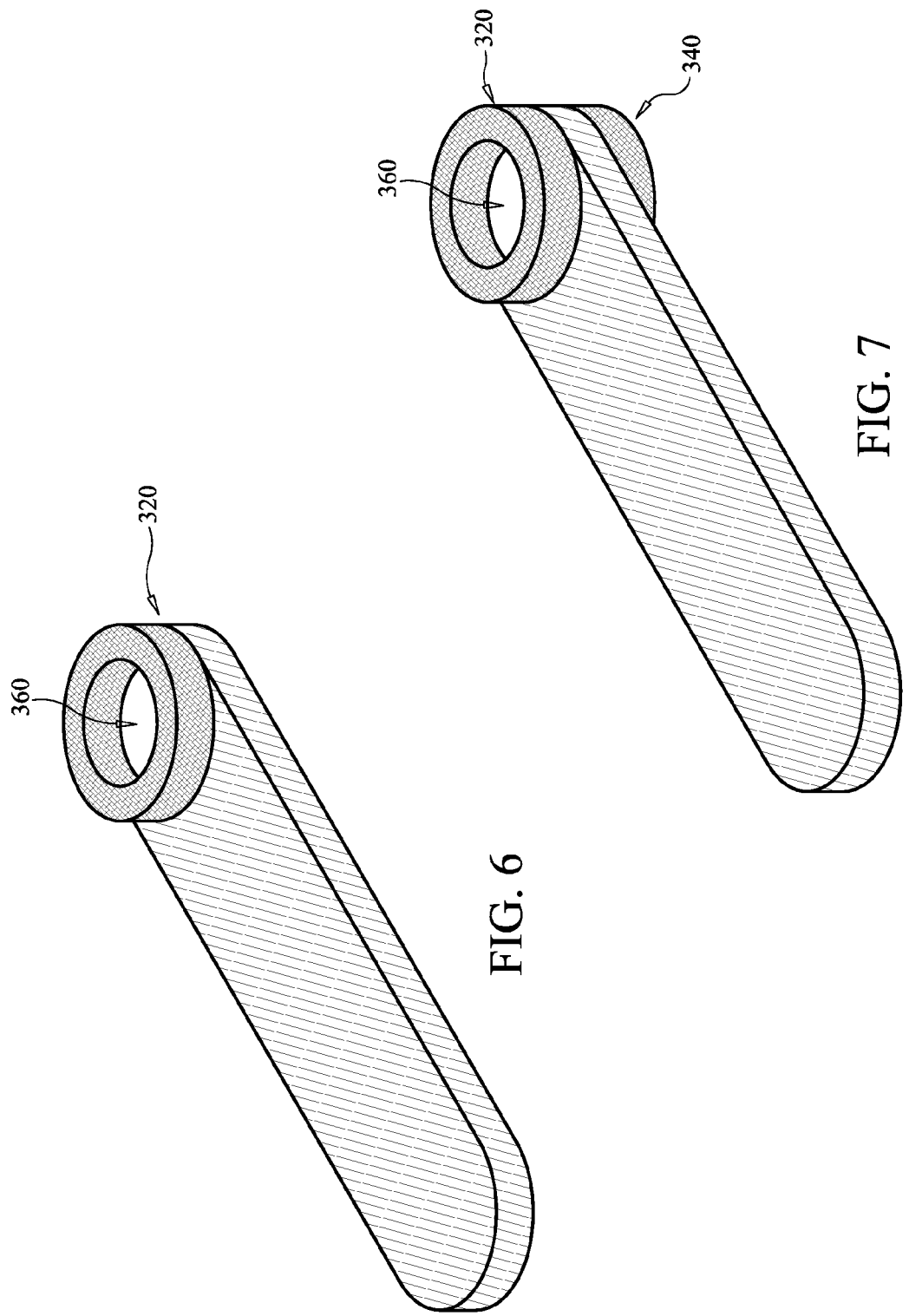

INJECTION MOLDED COMPOSITE BLANK AND GUIDE

PRIORITY AND CROSS REFERENCES

This application claims priority from U.S. application Ser. No. 14/386,382 filed on 19 Sep. 2014, International Application No. PCT/US2013/033465 filed on 22 Mar. 2013, U.S. Provisional Application No. 61/615,040 filed on 23 Mar. 2012 and U.S. Provisional Application No. 61/615,000 filed on 23 Mar. 2012, the teachings of each of which are incorporated by reference herein in their entirety.

BACKGROUND

Replacing metal and heavy parts with plastic parts is common. However, when the part takes on odd shapes or need structural strength replacement with plastic becomes more difficult. The use of fibers to reinforce the plastic is a common practice, with oriented fibers known to be stronger than unoriented fibers.

Affixing a thermoplastic material to a support structure is also known. For example, WO 03/102387 describes an oil pan for an internal combustion engine having a "shell of plastic material, and a support structure, having a plurality of perforations, that is fixedly attached to the exterior surfaces and/or the interior surfaces of the plastic shell." p. 1, ¶1. However, the current methods to manufacture such articles are considered to provide for an article that is too heavy for use in applications, such as aircraft interiors, requiring lightweight articles that maintain high strength in areas that are prone to failure under stress.

One such challenging article is the seat frame used in airplanes. Seat frames must bear a large load. Imagine the frame locked to the floor, with a person sitting in it, and the person behind the seat grasping the seat and using it to assist lifting him or herself out of the seat. The amount of torque on the support or weakest spot of the frame is quite large.

Many have tried to make a seat back using thermoset composites reinforced with fibers. Thermoset composites are time consuming to process with low throughput and increased costs. Efforts to increase the time have resulted in increased weight of the final part, making it unappealing to the airline industry.

WO 2010 111700 published 30 Sep. 2010 discloses one method of incorporating oriented strength enhancing carbon fibers. This method used a pre-formed tube of the fibers in a thermoplastic matrix, expanded the tube in a heated mold allowing the thermoplastic to set up in the "U" shape of the seat back.

This method is expensive and overdesigns strength where strength is not needed.

There exists therefore the need for a method of manufacturing an article that is lightweight, and that maintains high strength in areas that are prone to failure under stress.

SUMMARY

Disclosed herein is an article of manufacture comprising a structural blank and at least one guide, wherein the structural blank has a structural blank length, a structural blank width and a structural blank height wherein the structural blank height is less than or equal to the structural blank width and the structural blank width is less than or equal to the structural blank length; and is comprised of a plurality of oriented fiber plies in a structural blank thermoplastic matrix where at least one ply of the plurality of oriented fiber plies lies in a structural blank horizontal plane defined by the structural blank length and structural blank width, a structural blank top side corresponding to one side of the structural blank horizontal plane, a structural blank bottom side corresponding to the side opposite of the structural blank top side of the structural blank horizontal plane, and at least one structural blank guide hole passing from the structural blank top side through the structural blank horizontal plane to the structural blank bottom side; the guide has a guide length, a guide width and a guide height and is comprised of a plurality of randomly dispersed fibers in a guide thermoplastic matrix, wherein the guide is affixed to at least a portion of the structural blank top side with the guide thermoplastic matrix surrounding the structural blank guide hole.

In one embodiment the guide is overmolded into the structural blank hole. In a further embodiment the guide is affixed to the structural blank by melt bonding.

In one embodiment the structural blank thermoplastic matrix and the guide thermoplastic matrix may further comprise a thermoplastic selected from the group consisting of polyphenylene sulphide, polyetherimide, polyetheretherketone, polyetherketoneketone, polyethylene terephthalate, polybutylene terephthalate, and polyethylene naphthalate and the guide thermoplastic matrix comprises a thermoplastic selected from the group consisting of polyphenylene sulphide, polyetherimide, polyetheretherketone, polyetherketoneketone, polyethylene terephthalate, polyester, polybutylene terephthalate, polyethylene naphthalate, polyethersulfone and combinations thereof.

In one embodiment, the structural blank thermoplastic matrix and the guide thermoplastic matrix comprise the same thermoplastic.

In one embodiment the oriented fiber plies of the structural blank and the randomly dispersed fibers of the guide comprise a type of fiber selected from the group consisting of carbon fiber, glass fiber, polyaramide fiber or combinations thereof.

In one embodiment at least one type of fiber of the oriented fibers of the structural blank and at least one type of fiber of the randomly dispersed fibers of the guide are the same type of fibers.

In one embodiment the amount of fibers in the structural blank thermoplastic matrix is between 5% and 60% by weight of the structural blank.

In a further embodiment the amount of fibers in the guide thermoplastic matrix is between 5% and 60% by weight of the guide.

In one embodiment the structural blank is formed by compression molding the plurality of oriented fiber plies comprised of the structural blank thermoplastic matrix and oriented fibers.

In one embodiment the at least one structural blank hole is selected from the group of holes consisting of a circular hole or a non-circular hole. In a further embodiment the at least one structural blank hole is countersunk into the structural blank horizontal plane in the structural blank top side, the structural blank bottom side, or both the structural blank top side and the structural blank bottom side.

In one embodiment the plurality of randomly dispersed fibers of the guide are molded to a guide shape having a guide shape top side wherein the guide shape top side corresponds to one side of a guide horizontal plane corresponding to the guide length and the guide width, and a guide shape bottom side wherein the guide shape bottom side corresponds to side opposite the guide shape top side of the guide horizontal plane corresponding to the guide length and the guide width.

In one embodiment the guide passes from the structural blank top side through the structural blank hole to at least the structural blank bottom side.

In one embodiment the guide has a guide hole passing from the guide shape top side through the guide shape to the guide shape bottom side in the same plane as the at least one structural blank hole.

In one embodiment the at least one structural blank hole comprises a plurality of structural blank reinforcing holes. In a further embodiment the guide thermoplastic matrix passes through the plurality of structural blank reinforcing holes.

In one embodiment the plurality of random fibers of the guide are molded to a first guide shape affixed to the structural blank top side and a second guide shape affixed to the structural blank bottom side. In a further embodiment the first guide shape and the second guide shape are the same shape.

In one embodiment the article is void of an adhesive layer between the guide and the structural blank. In a further embodiment the structural blank is corona treated or flame treated before over molding.

Also disclosed in this specification is an article of manufacture comprising a "U" shaped member comprising a first leg, a second leg, a top member, and at least one leg pad up; wherein the first leg comprises a first thermoplastic matrix comprised of randomly dispersed fiber types and the first leg has a first leg first end which is not connected with the top member and a first leg second end which is connected with the top member, the second leg is comprised of a second thermoplastic matrix comprised of randomly dispersed fiber types and the second leg has a second leg first end which is not connected with the top member and a second leg second end which is connected with the top member, with the top member connected to the first leg and the second leg to form the "U" shaped member wherein the "U" shaped member has a "U" shaped member horizontal plane defined by the first leg, the second leg and the top member with the "U" with the first leg having a first leg stress location and the second leg having a second leg stress location, and, the at least one leg pad up is comprised of oriented fiber types oriented in a plane in a third thermoplastic matrix with the leg pad up affixed to either the first or second leg.

In one embodiment the fiber types in the first thermoplastic matrix, the second thermoplastic matrix and the third thermoplastic matrix are each selected from the group consisting of glass fibers and carbon fibers. In a further embodiment the first and second thermoplastic matrix are the same.

In one embodiment leg pad up is affixed to either the first leg or second leg at the first leg stress location or the second leg stress location.

In one embodiment the third thermoplastic matrix is the same thermoplastic as the first thermoplastic matrix.

In one embodiment the article of manufacture comprises a melt bond between the third thermoplastic matrix of the leg pad up and either the first thermoplastic matrix of the first leg or the second thermoplastic matrix of the second leg.

In one embodiment the first leg, the second leg and the top member are connected as one continuous piece.

In one embodiment the at least one leg pad up has at least one leg pad up hole through and the first or second thermoplastic matrix passes through the at least one first leg pad up hole.

In one embodiment the at least one leg pad up is a compression molded part having at least one ply of oriented fibers. In another embodiment thermoplastic matrix of the first leg has been injection molded around the leg pad up.

Further disclosed in this specification is a process for structurally reinforcing a seat back, said process comprising melt bonding a leg pad up comprised of oriented fibers oriented in a plane within a third thermoplastic to a portion of a "U" defined by a first leg comprising randomly dispersed fibers in a first thermoplastic matrix, a second leg comprising randomly dispersed fibers in a second thermoplastic matrix, and a top member of the seat back.

In one embodiment the melt bonding is done during the manufacture of the portion of the "U" by injection molding the first or second thermoplastic with dispersed fibers of the portion of the "U" at the edge of or around the leg pad up.

In one embodiment the third thermoplastic of the leg pad up is the same thermoplastic as the thermoplastic used to manufacture the portion of the "U" to which the leg pad up is melt bonded.

In one embodiment the leg pad further comprises a hole through which thermoplastic used to manufacture the portion of the "U" to which the leg pad up is melt bonded will flow during the injection molding process.

BRIEF DESCRIPTION OF THE DRAWINGS

FIG. 3 shows the structural blank having a structural blank hole.

FIG. 4 shows the structural blank countersunk around the structural blank hole.

FIG. 5 shows the structural blank having a plurality of holes.

FIG. 6 shows an article of manufacture using the process described herein.

FIG. 7 shows an article of manufacture using the process described herein.

DETAILED DESCRIPTION

Figure 1:
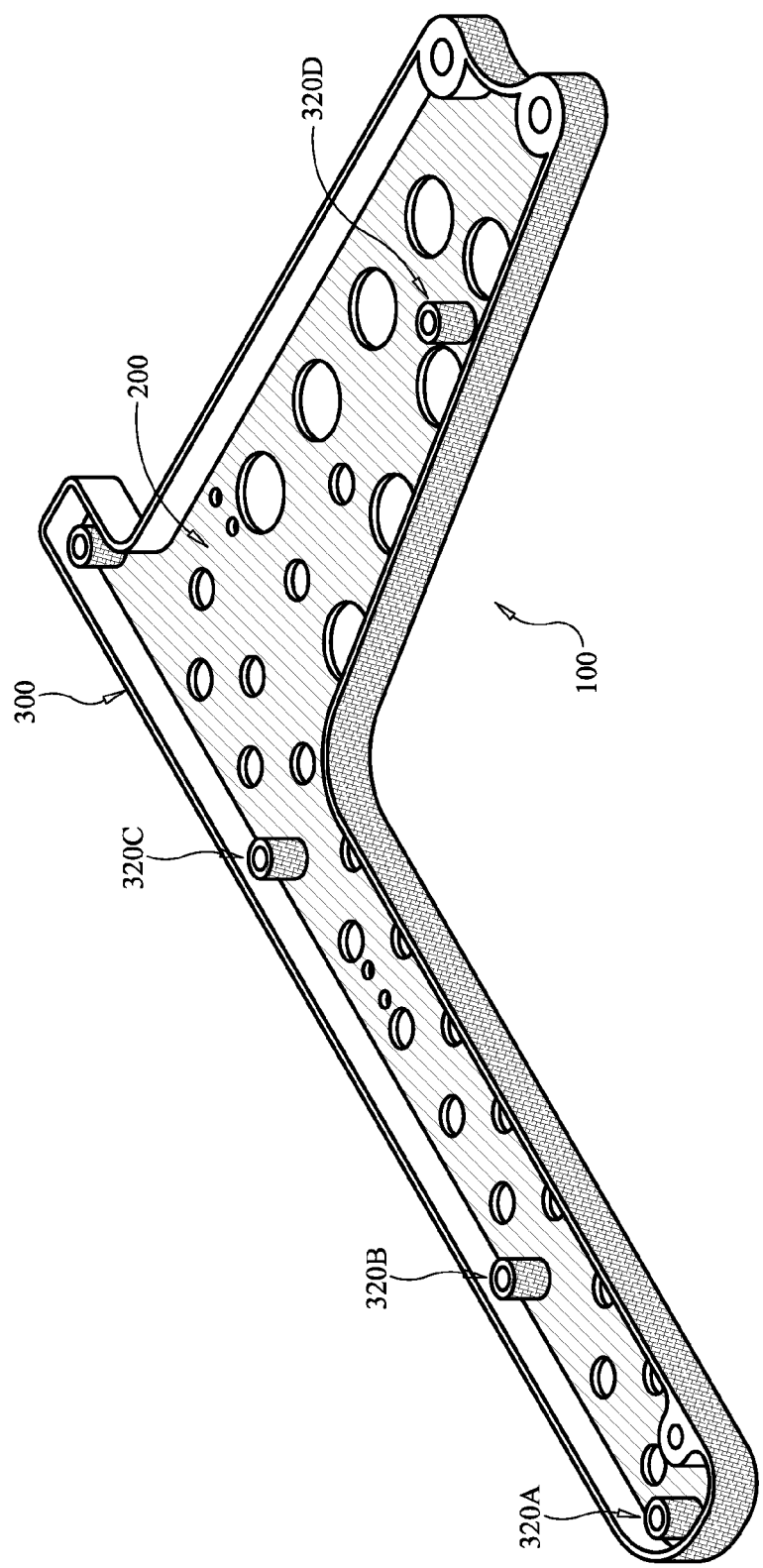
FIG. 1 shows an article of manufacture using the process described herein.

This specification discloses an article of manufacture (100) comprising a structural blank (200) having a plurality of oriented fiber plies in a thermoplastic matrix affixed to a guide (300, 320) having a plurality of randomly dispersed fibers in a thermoplastic matrix which may comprise chopped fibers. In one embodiment there is more than one guide (see for example FIG. 1, 320A, 320B, 320C, 320D)

The article of manufacture and process to manufacture the article relies upon the discovery that an injection moldable grade of thermoplastic comprising randomly dispersed or chopped fibers can be affixed to a thermoplastic composite having unidirectional oriented fibers in at least one ply by injection molding techniques such as injection molding, insert molding or over molding.

The structural blank will have a structural blank length dimension (110), a structural blank width dimension (111) and a structural blank height dimension (112). The structural blank height dimension is also known as the structural blank thickness. The structural blank height dimension will be less than or equal to the structural blank width dimension with the structural blank width dimension less than or equal to the structural blank length dimension. The structural blank will be comprised of plies of unidirectional oriented fibers. At least one ply of the plurality of oriented fiber plies in the structural blank will lie in a horizontal plane defined by the structural blank length dimension and the structural blank width dimension.

Figure 2:
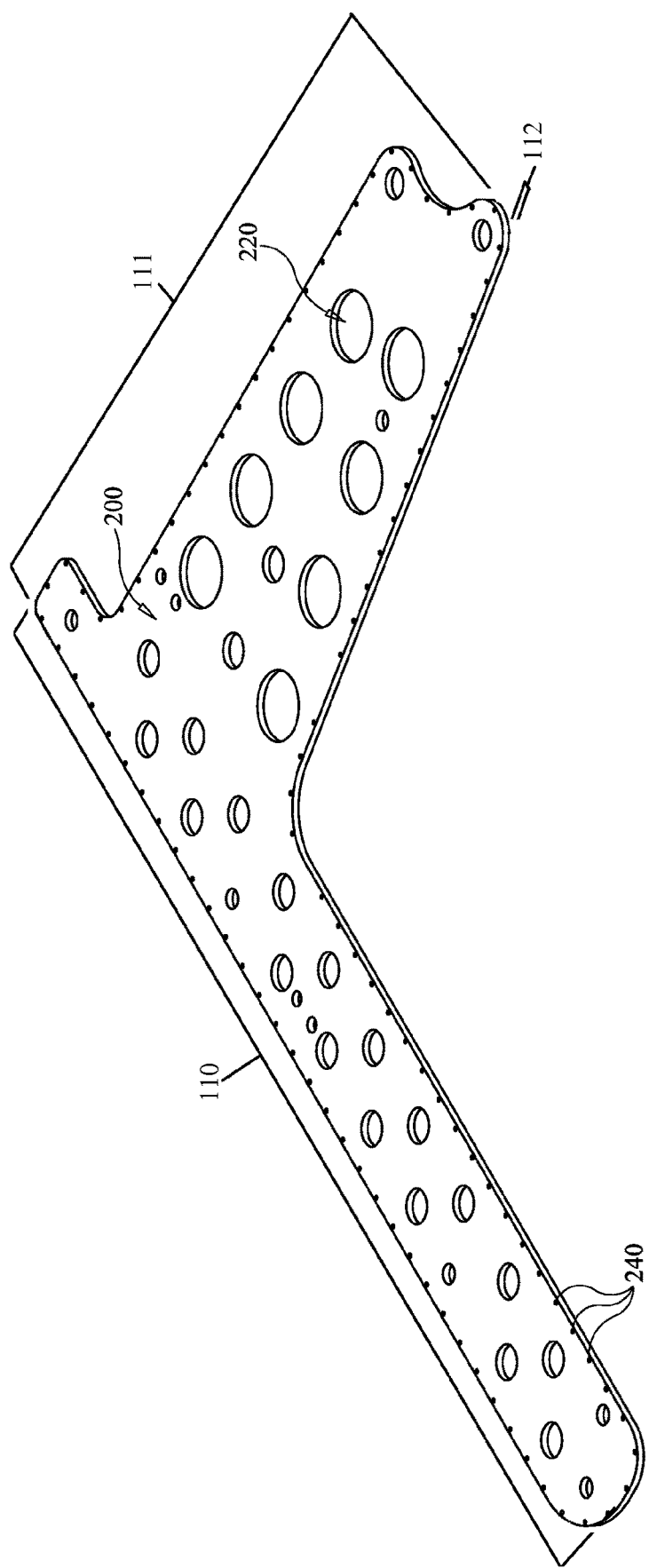
FIG. 2 shows a structural blank used to manufacture an article using the process described herein.
Figure 8:
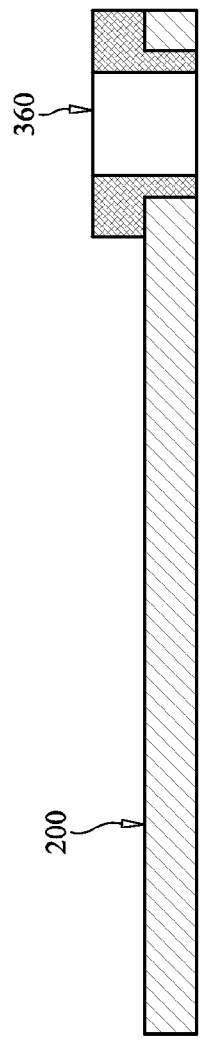
FIG. 8 shows a cut-away side view of an article of manufacture using the process described herein.
Figure 9:
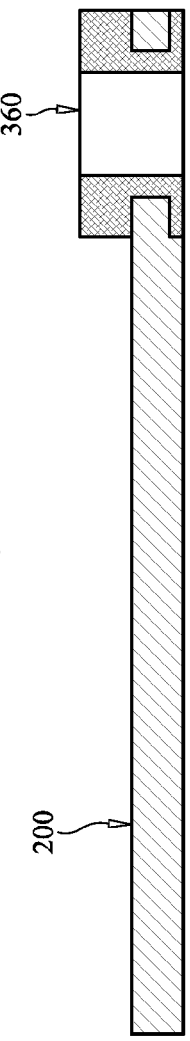
FIG. 9 shows a cut-away side view of an article of manufacture using the process described herein.

Although not necessary, the structural blank (FIGS. 2, 3 and 4 (200)) should have at least one hole (220) or perforation, but it is preferable to have a plurality of holes or perforations (240), at least some of which serve to further affix and/or reinforce the guide (300) to the structural blank. The at least one hole or perforation will pass through the horizontal plane of the structural blank from the top side of the structural blank to the bottom side of the structural blank. The structural blank hole may be a circular hole or a non-circular hole, such as a slot, ellipsoid, or trapezoid shape. In one embodiment, a plurality of structural blank holes may be located along the perimeter (240) of the structural blank corresponding to the structural blank length dimension and/or the structural blank width dimension and are used to reinforce the guide to the structural blank. In a further embodiment, the plurality of structural blank holes are structural blank guide holes through which the guide thermoplastic matrix passes, but are not used to reinforce the guide to the structural blank. The structural blank holes may also be used to create a guide ridge or rim (300).

In a preferred embodiment (FIG. 4) the structural blank hole or holes are countersunk (230) into the structural blank. The structural blank hole may be countersunk into the top side of the structural blank, the bottom side of the structural blank, or both the top side and the bottom side of the structural blank. The structural blank hole may be countersunk into the structural blank in a circular manner or a non-circular manner.

The structural blank will be made from a thermoplastic matrix material or a thermoset. The term "thermoset" means plastic materials having a three dimensional crosslinked network resulting from the formation of covalent bonds between chemically reactive groups, e.g., active hydrogen groups and free isocyanate groups or oxirane groups. Thermosets may be those known to the skilled artisan, e.g., crosslinked polyurethanes, crosslinked polyepoxides and crosslinked polyesters. Thermosets may be fabricated from crosslinked polyurethanes by the art-recognized process of reaction injection molding. Reaction injection molding typically involves, as is known to the skilled artisan, injecting separately, and preferably simultaneously, into a mold: (i) an active hydrogen functional component (e.g., a polyol and/or polyamine); and (ii) a functional component that forms covalent bonds with the active hydrogen functional component, such as an isocyanate functional component (e.g., a diisocyanate such as toluene diisocyanate, and/or dimmers and trimers of a diisocyanate such as toluene diisocyanate). The filled mold may optionally be heated to ensure and/or hasten complete reaction of the injected components. Upon complete reaction of the injected components, the mold is opened and the molded article is removed.

The term "thermoplastic" means a plastic material or matrix that has a softening or melting point, and is substantially free (having less than 5% by weight of the plastic material as part of the thermoplastic matrix) of a continuous phase of a three dimensional crosslinked network resulting from the formation of covalent bonds between chemically reactive groups, e.g., active hydrogen groups and free isocyanate groups. The thermoplastic material may contain a dispersion of ground thermosets, but the matrix material itself will be substantially free of thermosets.

Examples of thermoplastics from which the structural blank and the guide may be fabricated include, but are not limited to, thermoplastic polyphenylene sulfide, thermoplastic polyetheretherketone, thermoplastic polyetherketoneketone, thermoplastic polyetherketoneketone, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polypropylene, thermoplastic acrylonitrile-butadiene-styrene, thermoplastic polyethersulfone and mixtures or thermoplastic compositions containing one or more thereof.

Of the thermoplastic materials from which the structural blank and the guide may be fabricated polyphenylene sulphide is preferred. The guide may be fabricated from thermoplastic materials by the art-recognized process of injection molding and over molding onto the structural blank, in which a molten stream of thermoplastic material, e.g., molten thermoplastic polyphenylene sulphide, is injected into a mold, e.g., an optionally heated mold. In a preferred embodiment, a plurality of guides are continuously affixed to the structural blank from a single mold. In one embodiment, the structural blank is made from a thermoset material while the guide is made from a thermoplastic material.

The thermoplastic materials from which the structural blank may be fabricated and the thermoplastic materials from which the guide may be fabricated, are preferably reinforced with a material type selected from the group consisting of glass fibers, carbon fibers, metal fibers, polyaramide fibers, polyamide fibers and mixtures thereof. The reinforcing fibers, and the glass fibers in particular, may have sizings on their surfaces to improve miscibility and/or adhesion to the thermoset or thermoplastic into which they are incorporated, as is known to the skilled artisan. Carbon fibers are a preferred reinforcing material in the present invention. If used, the reinforcement material, e.g., glass fibers, is typically present in the thermoset and/or thermoplastic of the structural blank in a reinforcing amount, e.g., in an amount of from 5 percent by weight to 60 percent by weight, based on the total weight of the structural blank. If used, the reinforcement material, e.g., glass fibers, is typically present in the thermoplastic of the guide in a reinforcing amount, e.g., in an amount of from 5 percent by weight to 60 percent by weight, based on the total weight of the guide. In a preferred embodiment, the reinforcing material of the structural blank and the reinforcing material of the guide are the same reinforcing material.

To obtain the strength required, the fibers in the structural blank are preferably continuous fibers and oriented in different parallel planes of the structural blank. These planes are also called plies. One method of manufacturing the thermoplastic structural blank is to take a series of individual plies which are thermoplastic materials having oriented fibers running their length and lay the plies one on top of the other. The oriented fibers can have a different orientation of one ply relative to another ply. These various plies are often referred to as pre-pregs and are available on the open market, usually in rolls. Once the plies have been laid one on top of the other, the plies are heat compression molded into a strong structural bond by applying heat and pressure to melt and press the plies together. This pressing could be done to create a flat sheet from which the structural blank could be cut, or the plies could be precut, laid into a mold and the pressure and heat applied. A continuous manufacturing operation of this type is described in DE 4017978, the teachings of which are incorporated herein.

The oriented fiber in a ply may also be woven with fibers in the ply so that many fibers are aligned in a first direction, the other fibers are aligned in a direction different from the first direction, but in the same direction considered a second direction, passing over and under the fibers aligned in the first direction and are thus woven with the fibers aligned in the first direction.

The oriented fibers will form a plane within the thermoplastic matrix of the structural blank. If many plies of fibers are used, the plies will be separate planes. The oriented fibers will have an orientation direction. While the oriented fibers in one plane or ply may be rotated or offset relative to the oriented fibers in another plane or ply, at any given point in the structural blank, the oriented fibers in one ply will not be oriented in a direction that traverses into another ply. Often times only a uni-directional orientation is needed. It is also possible that the thermoplastic matrix used to surround the oriented fibers may further comprise chopped or dispersed fibers as well.

The carbon fibers used to form the structural blank may have an average fiber diameter of 4 micrometers to 12 micrometers. One suitable carbon fiber is from Zoltek Corporation of St Louis, Mo. USA, and has the trade name Panex 35. Other suitable carbon fibers are from Hexcel Corporation of Stamford, Conn. USA, and include AS4 carbon fibers and IM7 carbon fibers. The fiber volume fraction may be 0.5 to 0.7 of the composite structural blank. In the case of nano-fibers, diameters of 2 to 12 microns are typical.

The thermoplastic materials from which the guide may be fabricated are often reinforced with a plurality of randomly dispersed fiber types selected from the group consisting of glass fibers, carbon fiberes, metal fibers, polyamide fibers and mixtures thereof. The plurality of randomly dispersed fiber types may be the same type of fiber as those of the oriented fibers in the structural blank thermoplastic matrix. In one such embodiment, the randomly dispersed fibers originate as pre-pregs and are chopped or cut into smaller, randomly dispersed fibers prior to being introduced to the guide thermoplastic matrix.

If more bonding is needed, the structural blank can be corona treated or flame treated to modify the surface area to be more bondable with the thermoplastic of the guide. The best bond strength is expected when the thermoplastic matrix of the structural blank is the same thermoplastic matrix as the guide. The increased strength of the assembly at the respective stress location will be in part a function of the number of holes or perforations in the structural blank, the diameter or thickness of the holes or perforations, countersinking the at least one structural blank hole, and whether the material of the leg insert is corona treated or flame treated. The strength increase will also be a function of the known structural strength relationships of oriented fibers, the degree of orientation, fiber choice and fiber density. Because the preferred manufacturing technique is injection molding, over molding or insert molding the guide is affixed to the structural blank by melt bonding during the molding process.

This type of melt bonding occurs when the thermoplastic of the leg pad-up is exposed to the molten thermoplastic of the leg or top section being injection molded, insert molded or over molded to or around the leg pad-up. For the best melt bonding, the thermoplastic materials should be the same. However, structurally similar materials will melt bond, but in general the melt point of the thermoplastic material of the leg pad-up should be greater or equal to the melt point of the thermoplastic of the leg or top section being injection molded, insert molded or over molded to or around the leg pad-up.

Because the preferred manufacturing technique is overmolding the guide into the structural blank hole (FIGS. 6-11), the guide is preferably affixed to the structural blank by melt bonding. In a preferred embodiment, the guide will not be affixed to the structural blank by adhesion between the guide and the structural blank, or by an adhesive layer between the guide and the structural blank. Therefore, the article of manufacture is void of an adhesive layer between the guide and the structural blank. If the guide is affixed to the structural blank by an adhesion layer between the guide and the structural blank, such adhesion layer may comprise an adhesive material such as tape or glue, welding in the form of resistance welding, corona treating, ultrasonic welding, or combinations thereof.

Figure 14:
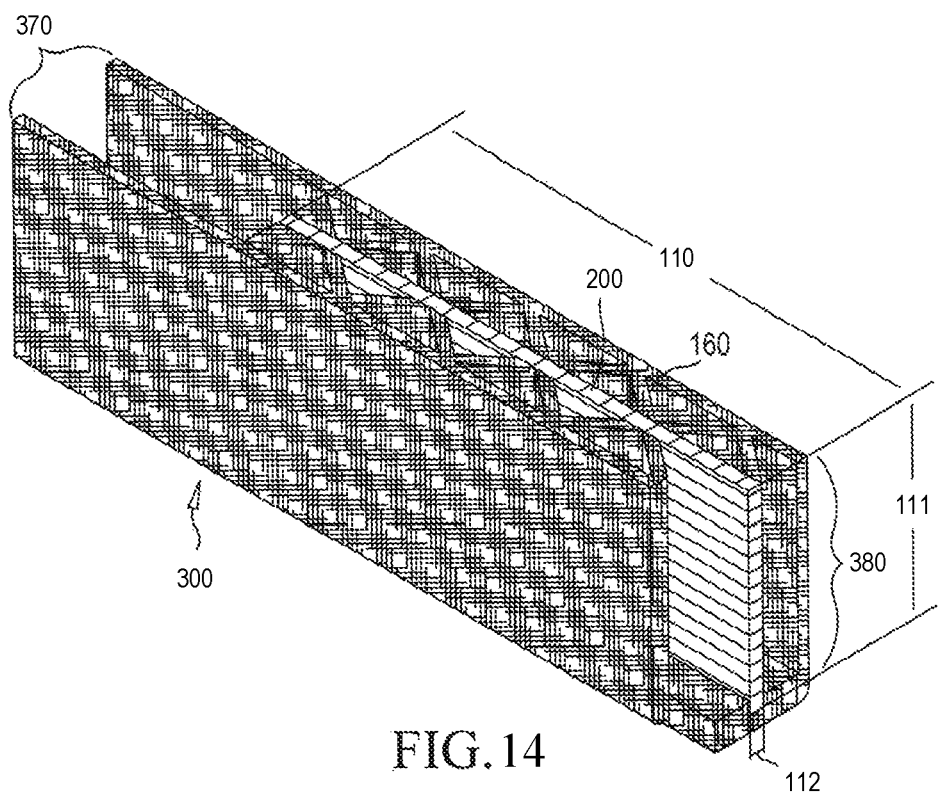
FIG. 14 is a depiction of blow up of an embodiment of the claimed invention.
Figure 15:
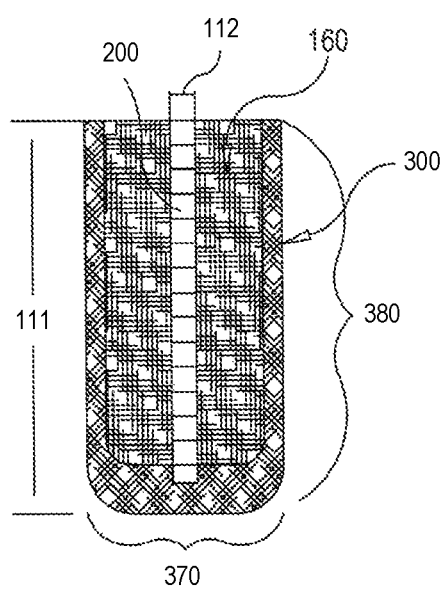
FIG. 15 is a cutaway view of an embodiment of the claimed invention.

In a preferred embodiment (FIGS. 9, 14 and 15), the guide is molded to a guide shape having a guide shape length, a guide shape width (370) and a guide shape height (380). The guide shape will have a horizontal plane corresponding to the guide shape width and the guide shape length. The guide shape will also have a guide shape top side corresponding to one side of the guide shape horizontal plane and a guide shape bottom side corresponding to the side of the guide shape horizontal plane opposite from the guide shape top side. The guide shape may be circular or non-circular. The structure of the guide may have numerous configurations or shapes. In a preferred embodiment of the present invention at least a portion of the guide comprises a channel having a base or bottom and side walls, each having interior surfaces which define a hollow interior. The guide may also include a plurality of reinforcing ribs (FIGS. 14 and 15, 160) located within hollow interior of the channel. At least a portion of the reinforcing ribs are formed by molding of the thermoplastic material so that at least a portion of the plastic material extends through at least some of the perforations in the structural blank. These reinforcing ribs may have configurations selected from, but not limited to, X-like configurations, zig-zag configurations, curved or arcuate configurations, parallel configurations and combinations thereof.

In one embodiment, there are two guide shapes where the second guide shape (340) has a second guide shape length, a second guide shape width and a second guide shape height. The second guide shape will have a horizontal plane corresponding to the second guide shape width and the second guide shape length. The second guide shape will also have a second guide shape bottom side corresponding to one side of the guide shape horizontal plane and a second guide shape top side corresponding to the side of the guide shape horizontal plane opposite from the guide shape bottom side. The second guide shape may be circular or non-circular.

In a preferred embodiment, when overmolding the guide to the structural blank, the thermoplastic material of the guide passes from the structural blank top side through the structural blank hole to the structural blank bottom side. In one embodiment, the overmolding of the guide to the structural blank occurs at the perimeter of the structural blank corresponding to the structural blank length dimension and the structural blank width dimension wherein the guide thermoplastic material passes through the plurality of structural blank holes located along the perimeter of the structural blank in order to form a raised edge along the perimeter of the structural blank.

Figure 10:
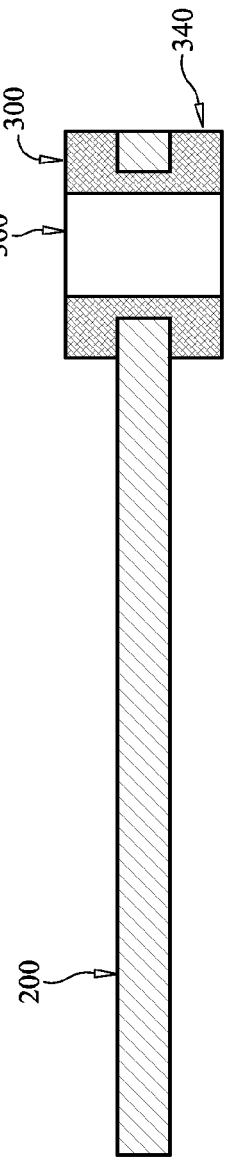
FIG. 10 shows a cut-away side view of an article of manufacture using the process described herein.
Figure 11:
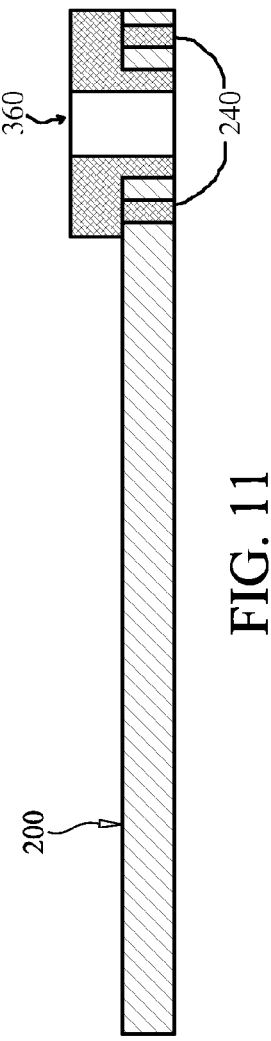
FIG. 11 shows a cut-away side view of an article of manufacture using the process described herein.

In one embodiment, the guide contains a guide hole (360) passing from the guide shape top side through the guide shape to the guide shape bottom side. In a preferred embodiment, the guide hole passes through the guide shape in the same plane as the at least one structural blank hole (FIG. 10).

Figure 12:
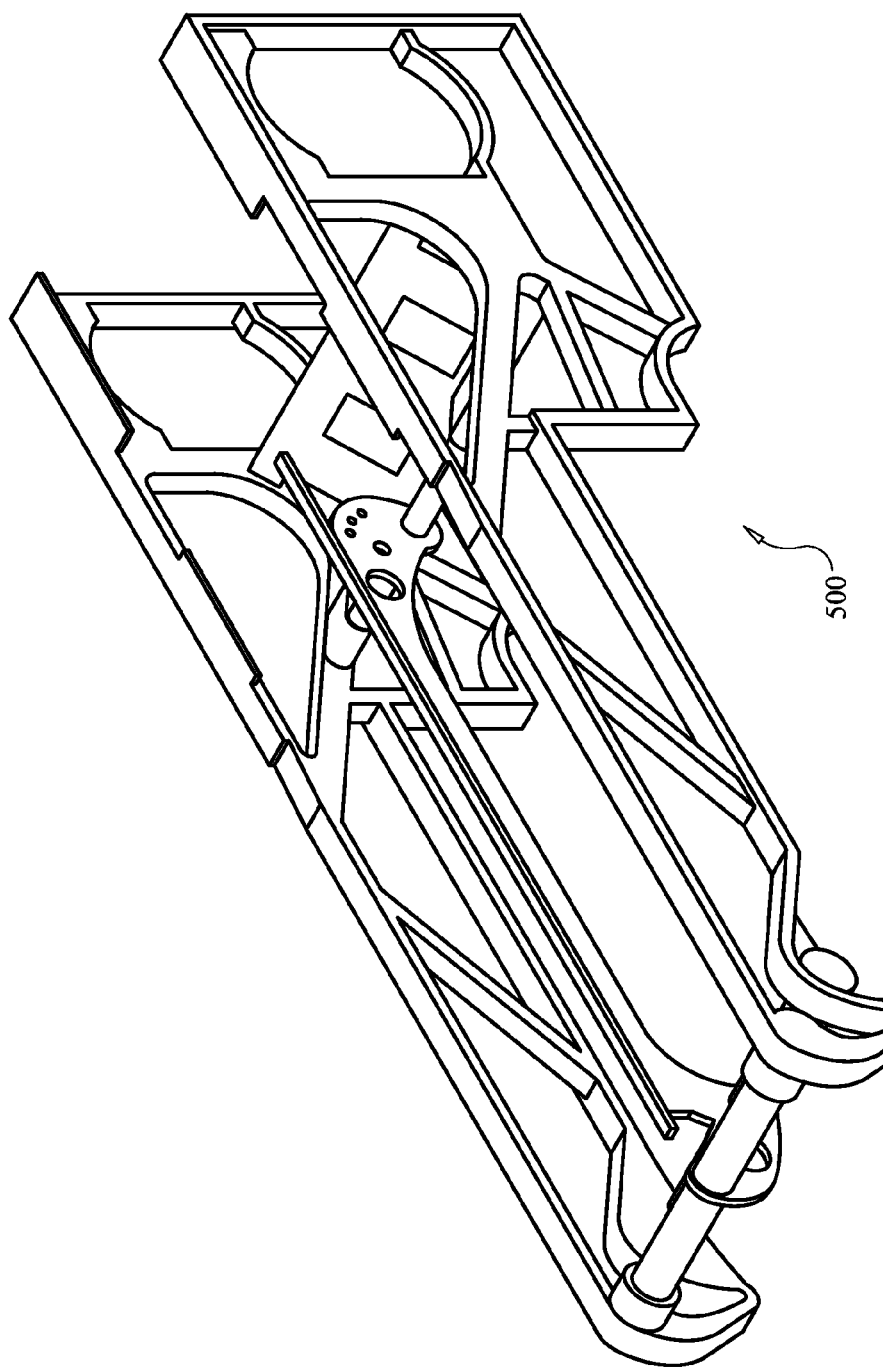
FIG. 12 shows an exemplary model of an article of manufacture using the process described herein.
Figure 13:
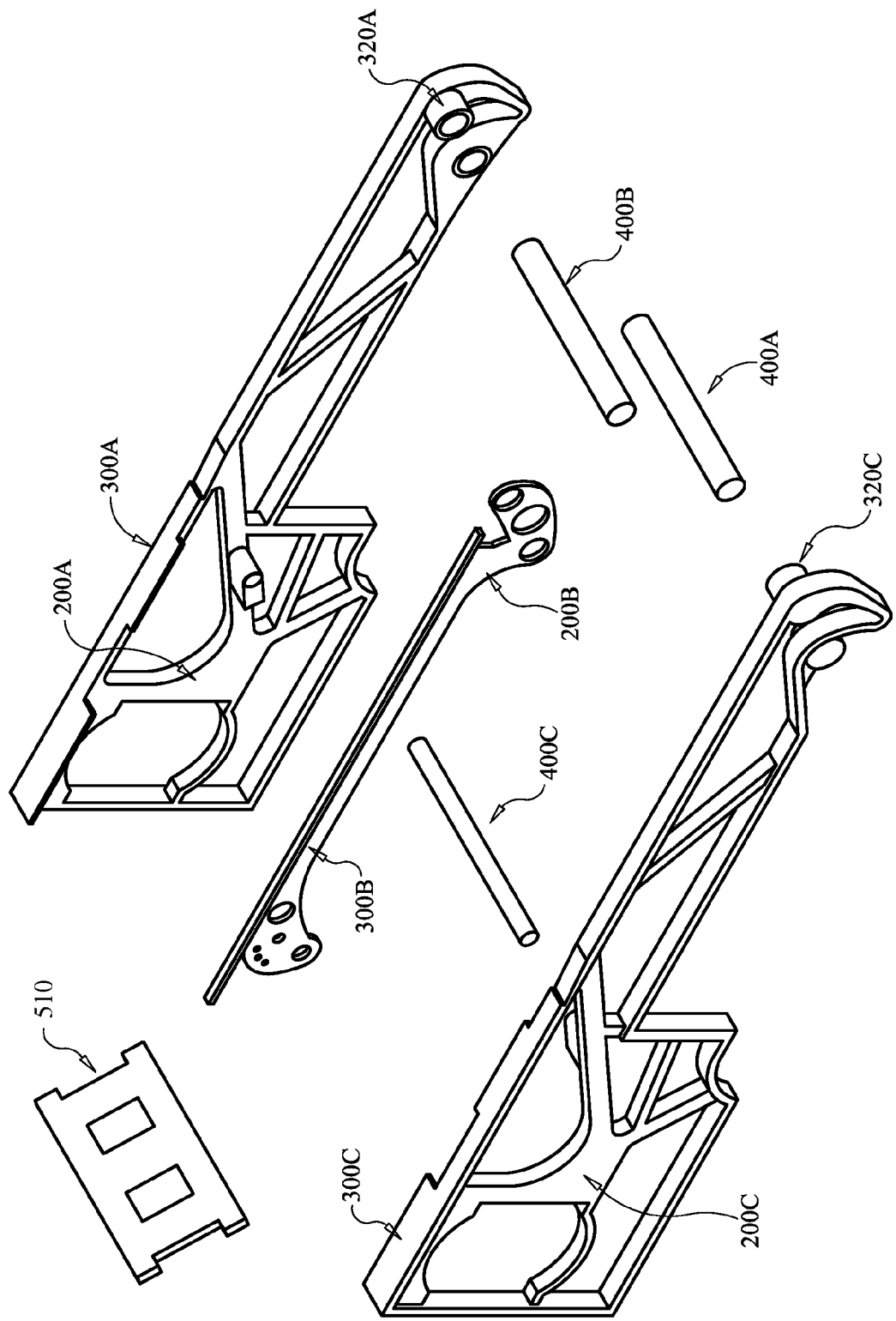
FIG. 13 shows the exemplary model of FIG. 12 disassembled.

FIG. 12 shows an assembled part (500). FIG. 13 shows the assembled part of FIG. 12 in disassembled form with 200A, 200B and 200C being the structural blank of the respective members, 300A, 300B and 300C being the respective raised perimeter edge guide and 320A and 320C being the respective guide containing a guide hole. 400A, 400B and 400C are rods or tubes and 510 is a stabilizer member.

The actual molding of an injection moldable material around a pre-fabricated core or insert, such as a structural blank, is well known in the art. U.S. Pat. No. 6,251,323, incorporated herein by reference, describes how to totally encapsulate the pre-fabricated material. The background section of U.S. Pat. No. 6,251,323 describes various other types of injection molding processes to injection mold a material onto a prefabricated part, such as a structural blank.

The article of manufacture described herein can take any number of forms. By way of example, but not limitation, the article of manufacture can be used in aircrafts, automobiles, motorcycles, bicycles, trains, or watercraft. By way of example, but not limitation, in aircraft applications the article of manufacture could be a seat center counsel, a seat center counsel frame, a tray table, a tray table support, a seat back frame, a seat leg, an overhead bin, an overhead bin frame, a drink cart, a drink cart frame, a foot rest, or a foot rest support.

This specification also discloses an article of manufacture comprising a longitudinal section and at least one leg pad up wherein the longitudinal section is injection molded and affixed to the pad up which contains strength reinforcing oriented fibers.

The article of manufacture comprises a single longitudinal section without adjoining structures. The longitudinal section will comprise a thermoplastic matrix comprised of randomly dispersed fibers. The longitudinal section will also comprise at least one pad-up for increased strength at a stress location.

Figure 16:
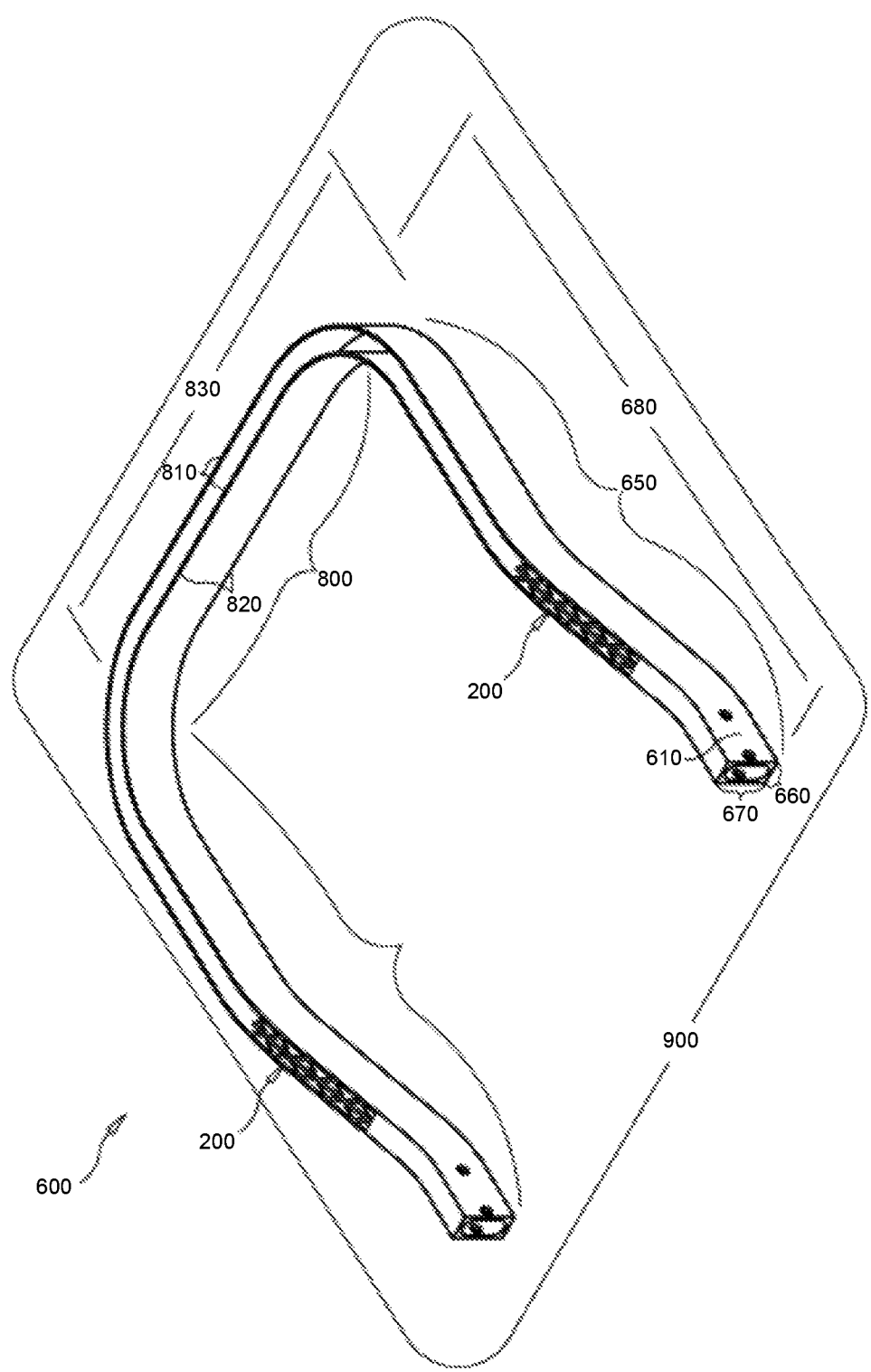
FIG. 16 is a depiction of an embodiment of a seat frame.
Figure 17:
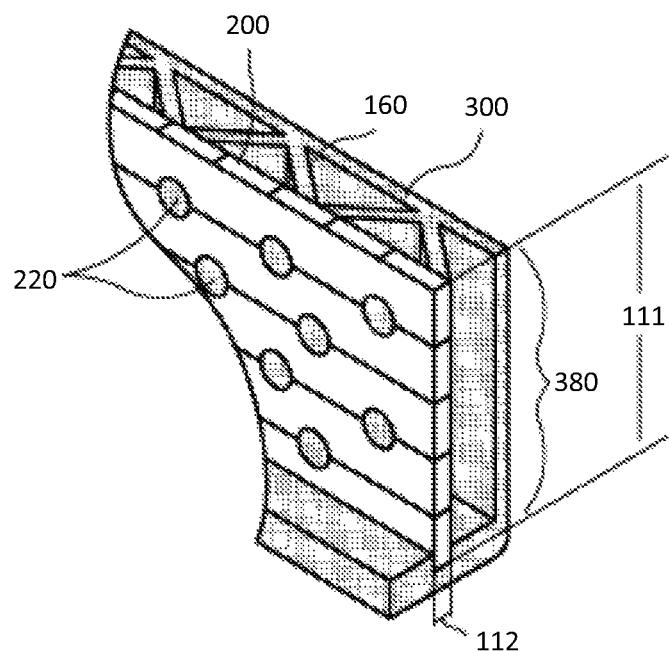
FIG. 17 is a cutaway view of an embodiment of the claimed invention.

In one embodiment, the longitudinal section is formed into an airplane seat back. This general structure can be seen in FIG. 16 where 600 denotes the composite seat back frame. In such an embodiment, the longitudinal section will have a first leg section (650), a second leg section (700) and a top section (800). The first leg section will have a first leg section length dimension (680), a first leg section width dimension (660), a first leg section height dimension (670). The length dimension will be the longest dimension and is aligned with the direction of the spine of a person sitting in the seat. The width dimension is the dimension traveling perpendicular to the length dimension, lying in the "U" structure horizontal plane defined by the first leg section, the second leg section and the top section which connects or joins the first and second leg sections. The first and second leg section horizontal dimensions are perpendicular to the "U" structure horizontal plane.

The top section could be straight piece, or a curved piece that transitions from the second end of the first leg section, running in the "U" structure horizontal plane and then transitions into the second end of the second leg section.

It is preferred that the first leg section, the second leg section and the top section are all one single molded part and are connected by melt flow or melt bonding of the thermoplastic matrix material. In this instance, the first leg section, the second leg section and the top section are all comprised of the same thermoplastic matrix.

For clarity, the first leg section further will have a first leg section first end (610). The second leg section is usually of similar, or even like dimensional design as the first leg section. The second leg section will have a second leg section length dimension, a second leg section width dimension, a second leg section height dimension, wherein the second leg section length is the longest dimension of the second leg section, the second leg section further having a second leg section first end.

As mentioned earlier, the top section will have a top section length dimension (830), a top section width dimension (810), a top section height dimension (820), with the top section connected to the first leg section second end and the second leg section second end in a "U" structure having a "U" structure horizontal plane (900) defined by the first leg section, the second leg section. Thus the first and second leg section, lie in the "U" structure horizontal plane.

The first leg section and second leg section will each have at least one stress location defined respectively as the first leg section stress location and the second leg section stress location. The stress location of the respective leg depends upon the leg design and how the leg is locked or permanently fixed. The stress location is the point where the leg without the leg pad-up structurally fails when an increasing force is applied to the top section when the first and second leg sections are fixed so they do not move. Structurally fails mean that the leg is permanently distorted from its original shape, which is usually observed as a kink, a collapse, or the propagation of a crack. In general, the leg pad-up (200) should be located at the leg stress location.

The increasing force is applied perpendicular to the "U" shaped member horizontal plane. In a preferred embodiment, the legs are made of the same mirror design and same dimensions and materials, so a force applied at the middle of the top section should cause both legs to fail at the same time insubstantially the same place. However, this is often not the case, and the force can be varied at different points along the top section to cause the leg of interest to fail before the other leg. Should a leg not fail, then its stress location is at the leg end furthest from the top section.

Where the article of manufacture is an airplane seat back, the airplane seat back can have one or more leg pad-ups as shown in FIG. 5, known as a "pad-up" in molding parlance. The first leg section will have a first leg section pad-up (200A) with a first leg section pad-up length dimension (110), a first leg section pad-up width dimension (112), and a first leg section pad-up height dimension (111) affixed to the first leg section inside the first leg section and located at the first leg section stress location with the first leg section pad-up length dimension corresponding to the first leg section length dimension, the first leg section pad-up height dimension corresponding to the first leg section height dimension, and the first leg section width dimension corresponding to the first leg section width dimension.

Most likely there will be a second leg section pad-up (200C) having a second leg section pad-up length dimension, a second leg section pad-up width dimension, and a second leg section pad-up height dimension connected with the second leg section inside the second leg section and located at the second leg section stress location with the second leg section pad-up length dimension corresponding to the second leg section length dimension, the second leg section pad-up height dimension corresponding to the second leg section height dimension, and the second leg section width dimension corresponding to the second leg section width dimension;

The first leg section pad-up is comprised of a first thermoplastic and oriented fibers and the second leg section pad-up is comprised of a second thermoplastic and oriented fibers.

This could be the inside or outside of the leg. During molding formation of the leg, a portion of the thermoplastic material of the leg will extend or pass through at least some of perforations (220) embedding the edges of the perforations in the thermoplastic material extending there through, thereby fixedly attaching the leg pad-up to the leg as well as melt bonding the thermoplastic of the leg pad-up with the thermoplastic matrix of the leg. In another embodiment, the thermoplastic will mold through the perforations or apertures and form and bond with the thermoplastic material on the other side of the leg pad-up, thereby more permanently affixing or connecting the leg pad-up to the leg thermoplastic.

When the leg pad-up is affixed to a leg the fibers are aligned so the plane lies substantially parallel to the side of the leg formed from the first end to the second end. Substantially parallel means that the plane is not perpendicular to the side of the leg, or does not pass through both sides of the leg in a perpendicular manner.

In a preferred embodiment the leg pad-up(s) will have at least one hole or perforation and the ribs will pass through holes of the leg pad-up and be molded around the inserted leg pad-up. The pad-up hole or aperture does not have to be round, but could be of hexagonal or even rectangular or square design to prevent turning about the hole.

It should be clear to one of ordinary skill how using the much stronger directionally oriented fibers of the leg pad-up placed at and into areas of stress locations allows for an injection molded seat back to be quickly made. The invention is not limited to the embodiments disclosed but to all equivalents using the principles taught herein.

Figure 18:
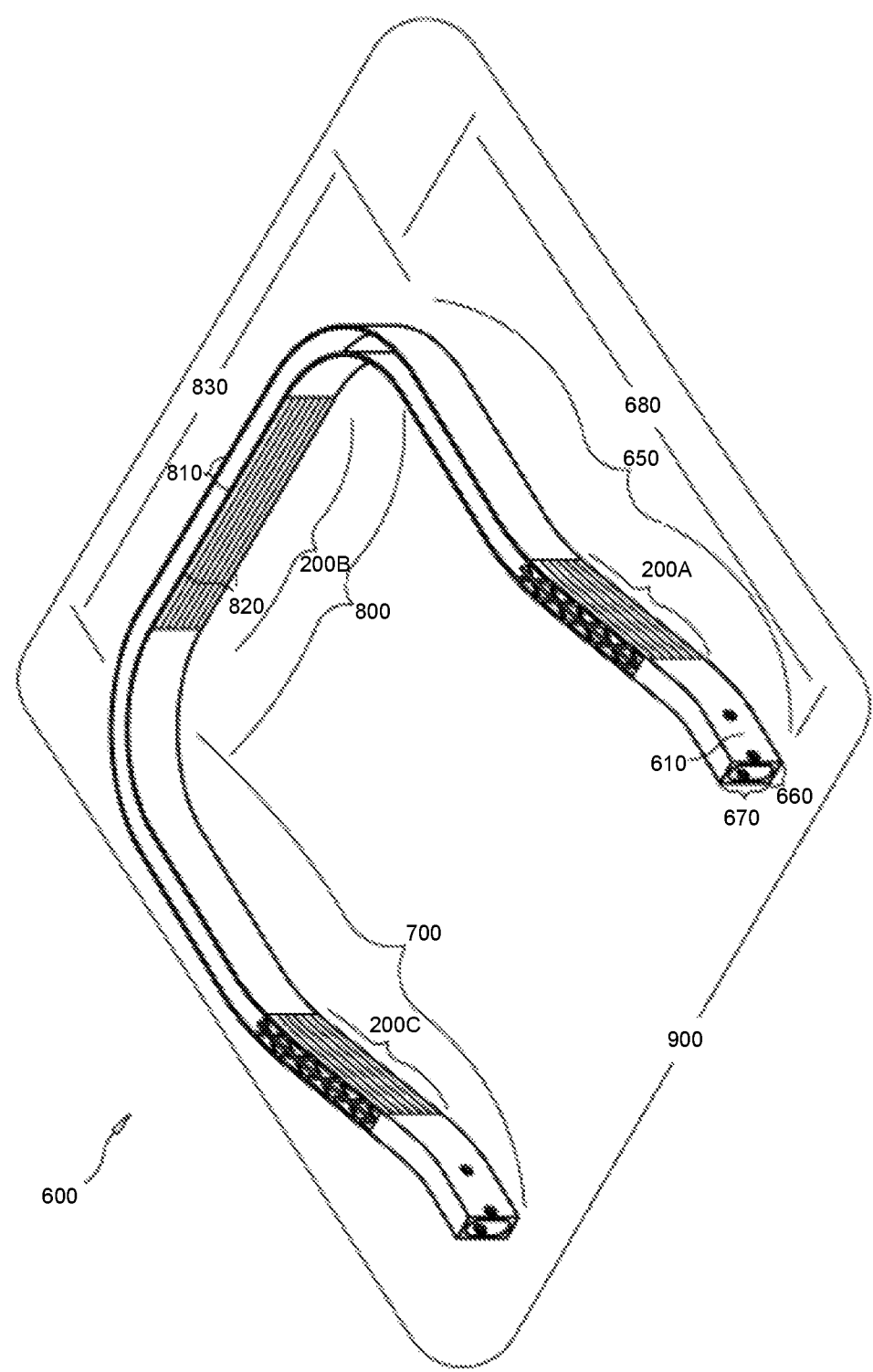
FIG. 18 is another depiction of an embodiment of a seat frame.

FIG. 18 shows how the leg pad-up 200A, 200B, or top section pad-up 200C may be affixed to the outside of the leg or top section. In this instance the pad-up is placed on the outside of the wall of the mold and the thermoplastic matrix injection molded or over molded onto and through any holes of the leg pad-up.

Because this invention may use thermoplastics that are inherently flame retardant, the use of additional flame retardants is not considered necessary. Thus, the article of this invention is halogen free, meaning that the total amount of halogens which are not present as catalyst for the thermoplastic material, is less than 1% by weight of the total composition halogens. The amount of halogen is the amount of material as halogen, not the amount of Halogen compound.

Although particular embodiments of the invention have been described herein, it will be understood that the invention is not limited correspondingly in scope, but includes all changes and modifications coming within the spirit and terms of claims appended hereto. Particularly, the current invention is not limited to an airplane seat back frame, but encompasses any structural component which can be made of thermoplastic materials requiring lighter weight and increased strength.

Where the current invention is in the form of an airplane seat back, the structure of the legs may have numerous configurations or shapes. In a preferred embodiment of the present invention at least a portion of the leg comprises, a channel having a base or bottom and side walls, each having interior surfaces which define a hollow interior.

The invention claimed is:

1. An article of manufacture comprising at least one thermoplastic injection molded guide melt bonded to a structural blank, wherein the at least one thermoplastic injection molded guide comprises a guide thermoplastic matrix, wherein the at least one thermoplastic injection molded guide includes a first thermoplastic injection molded guide having a guide shape comprising a guide shape width, a guide shape length and a guide shape height with a guide shape top side corresponding to a first side of a guide shape horizontal plane, a guide shape bottom side corresponding to a second side of the guide shape horizontal plane opposite the first side of the guide shape horizontal plane with the guide shape horizontal plane corresponding to a guide shape length and a guide shape width;

the structural blank having a structural blank length, a structural blank width, and a structural blank height wherein the structural blank height is less than the structural blank width and the structural blank width is less than or equal to the structural blank length, and the structural blank comprises at least one ply containing a plurality of oriented continuous fibers in a structural blank thermoplastic or thermoset matrix wherein the plurality of oriented continuous fibers are selected from the group consisting of unidirectional oriented fibers and woven oriented fibers, and the at least one ply lies in a structural blank horizontal plane defined by the structural blank length and the structural blank width, a structural blank top side corresponding to one side of the structural blank horizontal plane, a structural blank bottom side opposite of the structural blank top side, a structural blank perimeter, and at least one structural blank hole passing from the structural blank top side to the structural blank bottom side; and the first thermoplastic injection molded guide is molded to at least a portion of the structural blank top side, around the structural blank height, and to at least a portion of the structural blank bottom side wherein the guide thermoplastic matrix does not contact an internal edge of the at least one structural blank hole passing through the structural blank plane or a surface of the structural blank top side and the structural blank bottom side immediately adjacent a periphery of the at least one structural blank hole, and the at least one thermoplastic injection molded guide further comprises a plurality of randomly dispersed fibers in the guide thermoplastic matrix.

2. The article of manufacture of claim 1, wherein the at least one structural blank hole is a plurality of structural blank holes, wherein the guide thermoplastic matrix does not contact an internal edge or a surface of the structural blank top side and the structural blank bottom side immediately adjacent a periphery of each of the plurality of structural blank holes.

3. The article of manufacture of claim 1, wherein the first thermoplastic injection molded guide has at least one guide hole passing from the guide shape top side to the guide shape bottom side and the guide hole is not axially aligned with the at least one structural blank hole.

4. The article of manufacture of claim 1, wherein the structural blank further comprises at least one structural blank guide hole, wherein the guide thermoplastic matrix contacts a surface of the structural blank top side and a surface of the structural blank bottom side immediately adjacent a periphery of the at least one structural blank guide hole, and optionally contacts an internal edge of the at least one structural blank guide hole in the structural blank passing through the structural blank plane.

5. The article of manufacture of claim 4, wherein the first thermoplastic injection molded guide has at least one guide hole passing from the guide shape top side to the guide shape bottom side, axially aligned with the structural blank guide hole.

6. The article of manufacture of claim 1, wherein the structural blank further comprises at least one structural blank reinforcing slot passing through the structural blank plane such that a portion of the guide thermoplastic matrix passes through the structural blank to reinforce the at least one thermoplastic injection molded guide to the structural blank, wherein the at least one structural blank reinforcing slot is a plurality of structural blank reinforcing slots located along the structural blank perimeter each having some of the portion of the thermoplastic guide matrix passing through the structural blank to reinforce the at least one thermoplastic injection molded guide to the structural blank perimeter.

7. The article of manufacture of claim 6, wherein the first thermoplastic injection molded guide has at least one guide hole passing from the guide shape top side to the guide shape bottom side and the guide hole is not axially aligned with the at least one structural blank hole.

8. The article of manufacture of claim 1, wherein the structural blank further comprises at least one structural blank reinforcing hole passing through the structural blank plane such that a portion of the guide thermoplastic matrix passes through the structural blank to reinforce the at least one thermoplastic injection molded guide to the structural blank.

9. The article of manufacture of claim 8, wherein the at least one structural blank reinforcing hole is a plurality of structural blank reinforcing holes located along the structural blank perimeter each having some of the portion of the thermoplastic guide matrix passing through the structural blank to reinforce the at least one thermoplastic injection molded guide to the structural blank perimeter.

10. The article of manufacture of claim 9, wherein the first thermoplastic injection molded guide has at least one guide hole passing from the guide shape top side to the guide shape bottom side and the guide hole and the guide hole is not axially aligned with the at least one structural blank hole.

11. The article of manufacture of claim 9, wherein the structural blank further comprises at least one structural blank guide hole, wherein the guide thermoplastic matrix contacts a surface of the structural blank top side and/or a surface of the structural blank bottom side immediately adjacent a periphery of the at least one structural blank guide hole, and optionally contact an internal edge of at least one structural blank hole in the structural blank passing through the structural blank plane.

12. The article of manufacture of claim 11, wherein the guide thermoplastic matrix corresponding to the at least one structural blank guide hole belongs to the first thermoplastic injection molded guide or an at least one second thermoplastic injection molded guide, wherein the first injection molded guide comprises the portion of the thermoplastic guide matrix passing through the structural blank to reinforce the thermoplastic injection molded guide to the structural blank perimeter, and the at least one second thermoplastic injection molded guide does not contact the first injection molded guide and has a guide shape comprising a guide shape width, a guide shape length and a guide shape height with a guide shape top side corresponding to a first side of a guide shape horizontal plane, a guide shape bottom side corresponding to a second side of the guide shape horizontal plane opposite the first side of the guide shape horizontal plane with the guide shape horizontal plane corresponding to a guide shape length and a guide shape width.

13. The article of manufacture of claim 12, wherein the first thermoplastic injection molded guide and/or the at least one second thermoplastic injection molded guide has at least one guide hole passing from its corresponding guide shape top side to the guide shape bottom side, wherein each guide hole is axially aligned with a corresponding structural blank guide hole.

14. The article of manufacture of claim 13, wherein the at least one guide hole comprises a plurality of guide holes, the plurality of guide holes comprising a first plurality and a second plurality of guide holes, wherein the first thermoplastic injection molded guide has the first plurality of guide holes and the at least one second thermoplastic injection molded guide is a plurality of second thermoplastic injection molded guides each having one guide hole from the second plurality of guide holes.

* * * * *